(12) United States Patent
Masuda et al.

(10) Patent No.: US 6,626,268 B1
(45) Date of Patent: Sep. 30, 2003

(54) ELEVATOR DOOR OPENING AND CLOSING DEVICE AND OPENING AND CLOSING CONTROL METHOD

(75) Inventors: Toshio Masuda, Tokyo (JP); Yasuyuki Oikawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/031,063

(22) PCT Filed: Aug. 23, 2000

(86) PCT No.: PCT/JP00/05645
§ 371 (c)(1),
(2), (4) Date: Jan. 15, 2002

(87) PCT Pub. No.: WO02/16250
PCT Pub. Date: Feb. 28, 2002

(51) Int. Cl.7 .............................................. B66B 13/26
(52) U.S. Cl. .......................................... 187/317; 49/26
(58) Field of Search ................................ 187/316, 317; 49/25, 26, 28; 318/16, 466–469

(56) References Cited

U.S. PATENT DOCUMENTS

| 4,029,176 A | * | 6/1977 | Mills | 187/317 |
| RE30,719 E | * | 8/1981 | Mills | 187/317 |
| 5,641,951 A | * | 6/1997 | Cai et al. | 187/317 |
| 5,698,824 A | * | 12/1997 | Platt | 187/317 |
| 5,886,307 A | * | 3/1999 | Full et al. | 187/317 |
| 5,925,858 A | * | 7/1999 | Full et al. | 187/317 |
| 6,051,829 A | | 4/2000 | Full | |
| 6,167,991 B1 | * | 1/2001 | Full et al. | 187/317 |
| 6,279,687 B1 | * | 8/2001 | Pustelniak et al. | 187/317 |

FOREIGN PATENT DOCUMENTS

| JP | 3-195691 | 8/1991 |
| JP | 8-198556 | 8/1996 |
| JP | 8-027481 | 8/1997 |
| JP | 11-79632 | 3/1999 |
| JP | 11-246151 | 9/1999 |
| JP | 10-224291 | 2/2000 |

* cited by examiner

Primary Examiner—Jonathan Salata
(74) Attorney, Agent, or Firm—Leydig, Voit & Mayer, Ltd.

(57) ABSTRACT

In an opening and closing apparatus for an elevator door, a light-emitter and a light-detector are disposed in safety shoes disposed on doorstop edges of each of two abutting elevator doors. The light-emitter emits a reflection detection beam toward a landing side obliquely, relative to an opening and closing direction of the elevator doors. The reflection detection beam reflected by an obstruction on the landing enters the light-detector. When the reflection detection beam enters the light-detector, a reflection detection signal is output by a reflection detector portion and the direction of operation of the elevator doors is reversed to an opening direction.

10 Claims, 12 Drawing Sheets

FIG. 1

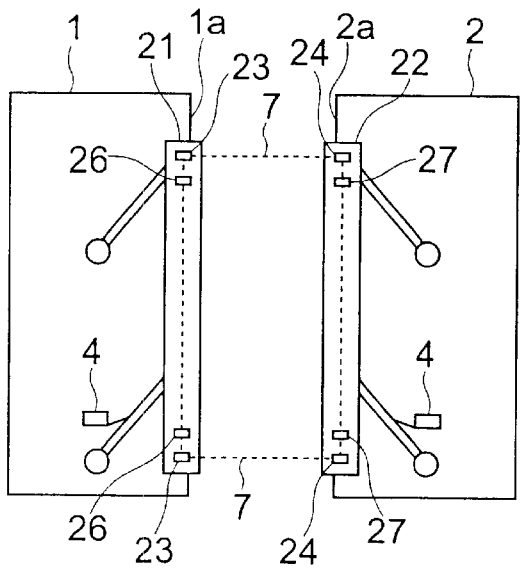

| | Legend | | |
|---|---|---|---|
| 1, 2 | Elevator Door | 23 | First Light-Emitting Portion |
| 1a, 2a, | Doorstop Edge Portion | 24 | First Light-Receiving Portion |
| 4 | Switches | 25 | Reflection Detection Beam |
| 7 | Interruption Detection Beam | 26 | Second Light-Emitting Portion |
| 21 | First Safety Shoe | 27 | Second Light-Receiving Portion |
| 22 | Second Safety Shoe | 28 | Obstruction |

FIG. 2

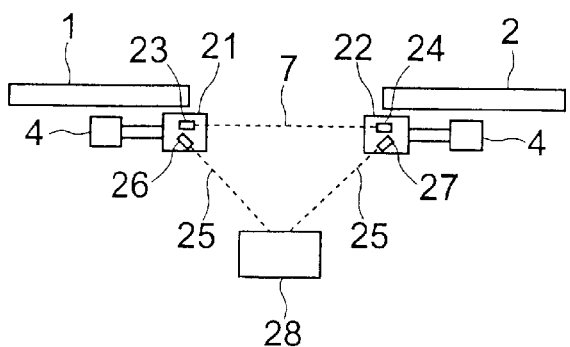

| | Legend | | |
|---|---|---|---|
| 1, 2 | Elevator Door | 23 | First Light-Emitting Portion |
| 1a, 2a, | Doorstop Edge Portion | 24 | First Light-Receiving Portion |
| 4 | Switches | 25 | Reflection Detection Beam |
| 7 | Interruption Detection Beam | 26 | Second Light-Emitting Portion |
| 21 | First Safety Shoe | 27 | Second Light-Receiving Portion |
| 22 | Second Safety Shoe | 28 | Obstruction |

| Legend | |
|---|---|
| 21 | First Safety Shoe |
| 22 | Second Safety Shoe |
| 26 | Second Light-Emitting Portion |
| 27 | Second Light-Receiving Portion |

| Legend | |
|---|---|
| 21 | First Safety Shoe |
| 22 | Second Safety Shoe |
| 26 | Second Light-Emitting Portion |
| 27 | Second Light-Receiving Portion |

| Legend | |
|---|---|
| 21 | First Safety Shoe |
| 22 | Second Safety Shoe |
| 26 | Second Light-Emitting Portion |
| 27 | Second Light-Receiving Portion |

| Legend | |
|---|---|
| 21 | First Safety Shoe |
| 22 | Second Safety Shoe |
| 26 | Second Light-Emitting Portion |
| 27 | Second Light-Receiving Portion |

| Legend | |
|---|---|
| 21 | First Safety Shoe |
| 22 | Second Safety Shoe |
| 26 | Second Light-Emitting Portion |
| 27 | Second Light-Receiving Portion |

| Legend | | | | | |
|---|---|---|---|---|---|
| 1, 2 | Elevator Door | 5 | Light Source | 7 | Interruption Detection Beam |
| 1a, 2a | Doorstop Edge Portion | 5a | Light-Emitting Components | | |
| 3 | Safety Shoe | 6 | Photodetector | | |
| 4 | Switches | 6a | Light-Detecting Components | | |

| Legend | | | | | |
|---|---|---|---|---|---|
| 1, 2 | Elevator Door | 5 | Light Source | 7 | Interruption Detection Beam |
| 1a, 2a | Doorstop Edge Portion | 5a | Light-Emitting Components | | |
| 3 | Safety Shoe | 6 | Photodetector | | |
| 4 | Switches | 6a | Light-Detecting Components | | |

| Legend | | | |
|---|---|---|---|
| 4 | Switches | 6a | Light-Detecting Components |
| 5a | Light-Emitting Components | 7 | Interruption Detection Beam |

ELEVATOR DOOR OPENING AND CLOSING DEVICE AND OPENING AND CLOSING CONTROL METHOD

TECHNICAL FIELD

The present invention relates to an opening and closing apparatus and an opening and closing control method for an elevator door capable of preventing passengers, freight, etc., from being caught in the elevator door as the door is being closed.

BACKGROUND ART

FIG. 15 is a front elevation of a conventional opening and closing apparatus for an elevator door such as disclosed in Japanese Patent Laid-Open No. Hei 8-198556, for example, viewed from a landing side, and FIG. 16 is a plan showing the opening and closing apparatus in FIG. 15.

In the figures, a safety shoe 3 is disposed on each of a doorstop edge portion 1a of an elevator door 1 and a doorstop edge portion 2a of an elevator door 2 abutting the elevator door 1. The safety shoes 3 are displaceable relative to the elevator doors 1 and 2 in opening and closing directions of the elevator doors 1 and 2 (to the left and right in the figures). Displacement of the safety shoes 3 is detected by switches 4 secured to the elevator doors 1 and 2.

A light source 5 having a plurality of light-emitting components 5a is disposed on the doorstop edge portion 1a of the elevator door 1. A photodetector 6 having a plurality of light-detecting components 6a is disposed on the doorstop edge portion 2a of the elevator door 2. The interruption detection beam 7 emitted by each of the light-emitting components 5a is detected by a corresponding light-detecting component 6a. FIG. 17 is a block diagram showing the opening and closing apparatus in FIG. 15. In the figure, the light-emitting components 5a are turned on by drive control signals output by a light emission control portion 8. A light detection control portion 9 for outputting a light detection signal is connected to the light detecting components 6a. The light reception signal from the light detection control portion 9 is input into a beam interruption detector portion 10. The beam interruption detector portion 10 decides whether the interruption detection beams 7 have been interrupted by an obstruction based on the light detection signal from the light detection control portion 9.

When interruption of the interruption detection beams 7 is detected, a beam interruption detection signal is output from the beam interruption detector portion 10 to a door control portion 11. Displacement detection signals from the two switches 4 are also input into the door control portion 11.

Next, operation will be explained. The interruption detection beams 7 are emitted by the light-emitting components 5 as the elevator doors 1 and 2 are being closed. If there are no obstructions, the interruption detection beams 7 from the light-emitting components 5a are detected by the light-detecting components 6a. If there is an obstruction, such as a passenger or freight, etc., between the light-emitting components 5a and the light-detecting components 6a, the interruption detection beams 7 are interrupted by the obstruction, and the interruption detection beams 7 fail to reach at least some of the light-detecting components 6a.

When the interruption detection beams 7 are interrupted, the beam interruption detection signal is output from the beam interruption detector portion 10 to the door control portion 11 and the direction of operation of the elevator doors 1 and 2 is reversed. Hence, the obstruction is prevented from being caught between the elevator doors 1 and 2.

If the safety shoes 3 are pushed by an obstruction, the displacement detection signal is sent to the door control portion 11 by the switches 4, also reversing the direction of operation of the elevator doors 1 and 2 and preventing the obstruction from being caught between the elevator doors 1 and 2.

However, in the conventional opening and closing apparatus, since the interruption detection beams 7 pass directly above a doorsill (not shown) which guides the opening and closing of the elevator doors 1 and 2 and a certain amount of time is required to respond from detection of the obstruction until reverse operation of the elevator doors 1 and 2, when an obstruction comes between the elevator doors 1 and 2 during the door-closing operation, the elevator doors 1 and 2 sometimes reverse operation after the obstruction has collided with the elevator doors 1 and 2 or the safety shoes 3, making it desirable for the obstruction to be detected earlier.

Furthermore, since the light source 5 and the photodetector 6 are disposed between the elevator doors 1 and 2 and the safety shoes 3, the thickness dimension of the doors as a whole is increased.

DISCLOSURE OF THE INVENTION

The present invention aims to solve the above problems and an object of the present invention is to provide an opening and closing apparatus and an opening and closing control method for an elevator door capable of preventing an obstruction from colliding with the elevator door or a safety shoe in advance by detecting the obstruction earlier.

An opening and closing apparatus for an elevator door according to the present invention is provided with: a light-emitting portion for emitting a reflection detection beam toward a landing side so as to be oblique relative to an opening and closing direction of the elevator door, the light-emitting portion being disposed in one of either a mount portion positioned on a doorstop edge portion of the elevator door or a facing portion facing the mount portion; a light-receiving portion for receiving the reflection detection beam reflected by an obstruction on the landing, the light-receiving portion being disposed in the other of either the mount portion or the facing portion; a reflection detector portion for detecting the reflection detection beam entering the light-receiving portion and outputting a reflection detection signal; and a door control portion for controlling opening and closing of the elevator door in response to the reflection detection signal from the reflection detector portion.

An opening and closing control method for an elevator door according to the present invention includes emitting a reflection detection beam toward a landing side so as to be oblique relative to an opening and closing direction of the elevator door during closing of the elevator door, monitoring whether the reflection detection beam is reflected by an obstruction on the landing, and reversing a direction of operation of the elevator door to an opening direction when reflection of the reflection detection beam is detected.

BRIEF DESCRIPTION OF THE DRAWINGS

FIG. 1 is a front elevation of an opening and closing apparatus for an elevator door according to Embodiment 1 of the present invention viewed from a landing side;

FIG. 2 is a plan showing the opening and closing apparatus in FIG. 1;

BEST MODE FOR CARRYING OUT THE INVENTION

Figure 3:
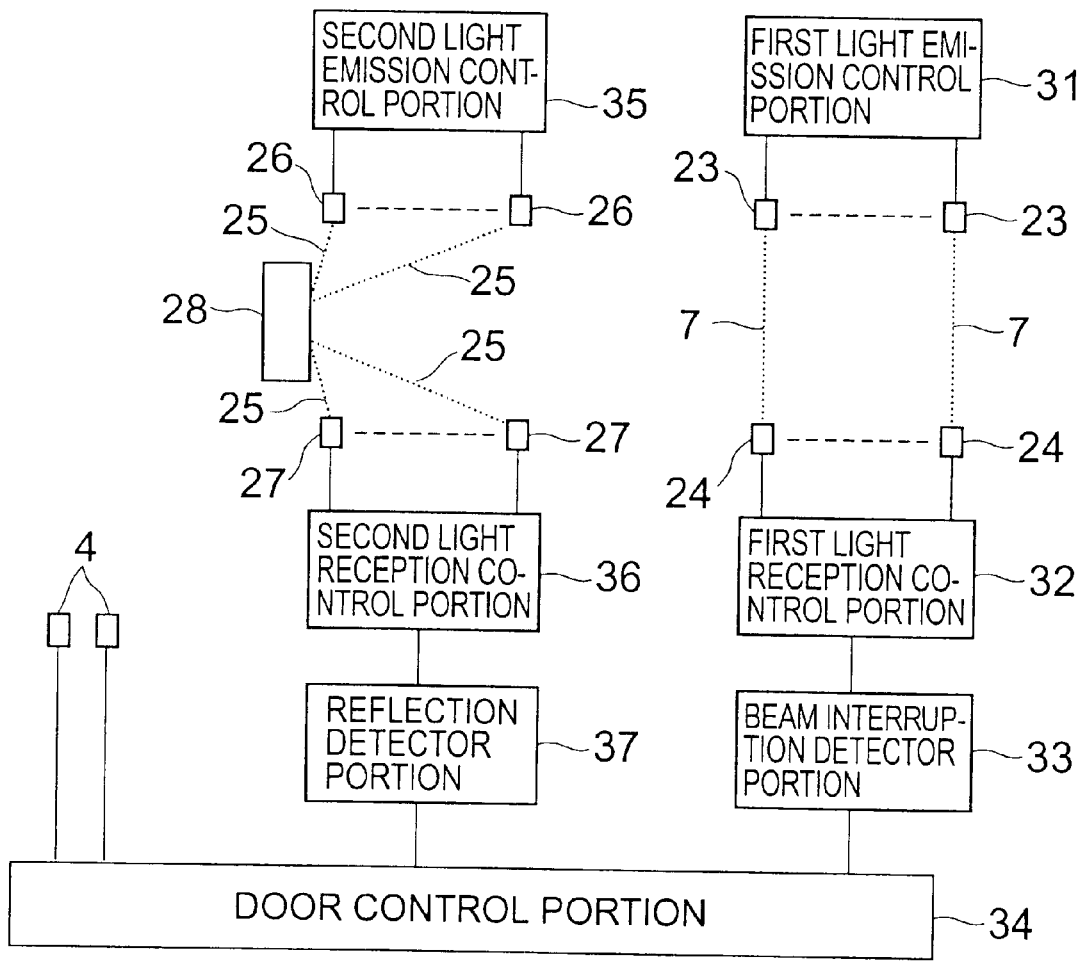
FIG. 3 is a block diagram showing the opening and closing apparatus in FIG. 1.

Preferred embodiments of the present invention will be described below with reference to the accompanying drawings.

Embodiment 1

FIG. 1 is a front elevation of an opening and closing apparatus for an elevator door according to Embodiment 1 of the present invention viewed from a landing side, and FIG. 2 is a plan showing the opening and closing apparatus in FIG. 1.

In the figures, a first safety shoe 21 functioning as a mount portion is disposed on a doorstop edge portion 1a of an elevator door 1. A second safety shoe 22 functioning as a facing portion facing the first safety shoe 21 is disposed on a doorstop edge portion 2a of an elevator door 2 abutting the elevator door 1. The safety shoes 21 and 22 are displaceable relative to the elevator doors 1 and 2 in the opening and closing directions of the elevator doors 1 and 2 (to the left and right in the figures). The displacement of the safety shoes 21 and 22 is detected by switches 4 secured to the elevator doors 1 and 2.

A plurality of first light-emitting portions (light-emitting components) 23 for emitting interruption detection beams 7 are disposed in the first safety shoe 21. A plurality of first light-receiving portions (light-receiving components) 24 for receiving the interruption detection beams 7 emitted by the first light-emitting portions 23 are disposed in the second safety shoe 22. The interruption detection beams 7 are emitted along the opening and closing direction of the elevator doors 1 and 2 directly above a doorsill (not shown) which guides the opening and closing of the elevator doors 1 and 2.

A plurality of second light-emitting portions 26 for emitting reflection detection beams 25 are disposed in the first safety shoe 21. The reflection detection beams 25 are emitted toward a landing side so as to be oblique relative to the opening and closing directions of the elevator doors 1 and 2. A plurality of second light-receiving portions 27 for receiving reflection detection beams 25 reflected by an obstruction 28 on the landing are disposed in the second safety shoe 22.

FIG. 3 is a block diagram showing the opening and closing apparatus in FIG. 1. In the figure, the first light-emitting portions 23 are turned on by a drive control signal output from a first light emission control portion 31. A first light reception control portion 32 for outputting a light reception signal is connected to the first light-receiving portions 24. The light reception signal from the first light reception control portion 32 is input into a beam interruption detector portion 33. The beam interruption detector portion 33 decides whether the interruption detection beams 7 have been interrupted by an obstruction based on the light reception signal from the first light reception control portion 32.

When interruption of the interruption detection beams 7 is detected, a beam interruption detection signal is output from the beam interruption detector portion 33 to a door control portion 34. Displacement detection signals from the two switches 4 are also input into the door control portion 34.

The second light-emitting portions 26 are turned on by a drive control signal output from a second light emission control portion 35. A second light reception control portion 36 for outputting a light reception signal is connected to the second light-receiving portions 27. The light reception signal from the second light reception control portion 36 is input into a reflection detector portion 37. The reflection detector portion 37 decides whether the reflection detection beams 25 have been reflected by an obstruction 28 based on the light reception signal from the second light reception control portion 36.

When reflection of the reflection detection beams 25 is detected, a reflection detection signal is output from the reflection detector portion 37 to the door control portion 34.

Next, operation will be explained. The reflection detection beams 25 are emitted by the second light-emitting portions 26 during the closing operation of the elevator doors 1 and 2. The reflection detection beams 25 from the second light-emitting portions 26 are not received by the second light-receiving portions 27 if there is no obstruction 28. If there is an obstruction 28 such as a passenger or freight on the landing, the reflection detection beams 25 are reflected by the obstruction 28, and the reflection detection beams 25 enter at least some of the second light-receiving portions 27.

When the reflection detection beams 25 enter, the reflection detection signal is output from the reflection detector portion 37 to the door control portion 34 and the direction of operation of the elevator doors 1 and 2 is reversed. Hence, the obstruction 28 is prevented from being caught between the elevator doors 1 and 2.

The method of detecting obstructions by means of the first light-emitting portions 23 and the first light-receiving portions 24 and the method of detecting obstructions by means of the safety shoes 21 and 22 are similar to the conventional methods.

In the opening and closing apparatus of this kind, because the reflection detection beams 25 are emitted towards the landing and any obstruction 28 positioned on the landing is detected by light reflected from the obstruction 28, the obstruction 28 is detected earlier, enabling the obstruction 28 to be prevented in advance from colliding with the elevator doors 1 and 2 or the safety shoes 21 and 22.

Furthermore, since the first and second light-emitting portions 23 and 26 and the first and second light-receiving portions 24 and 27 are disposed in the safety shoes 21 and 22, thickness dimensions of the doors as a whole can be reduced.

Embodiment 2

Figure 4:
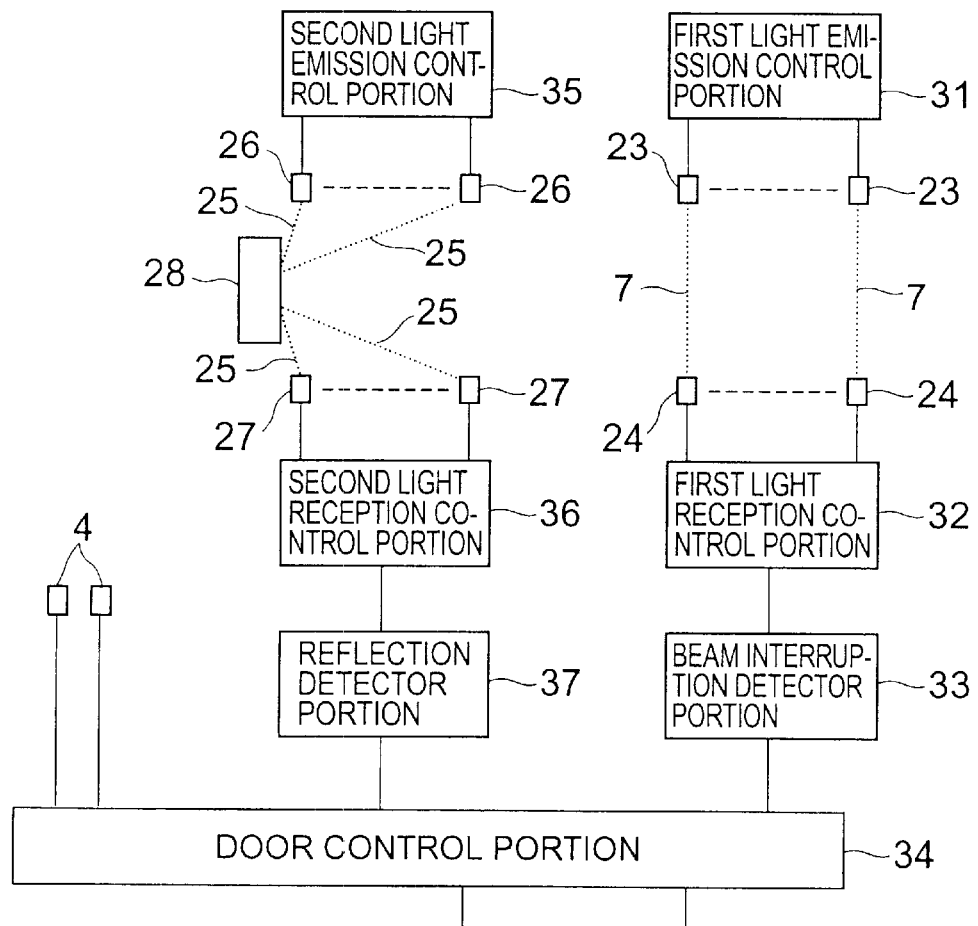
FIG. 4 is a block diagram showing an opening and closing apparatus for an elevator door according to Embodiment 2 of the present invention.

FIG. 4 is a block diagram showing an opening and closing apparatus for an elevator door according to Embodiment 2 of the present invention. In the figure, a door clearance signal from a door clearance detector portion 41 for detecting the clearance between the elevator doors 1 and 2 and a door opening and closing direction signal from a door direction output portion 42 are input into the door control portion 34. The rest of the construction is similar to that of Embodiment 1.

Figure 5:
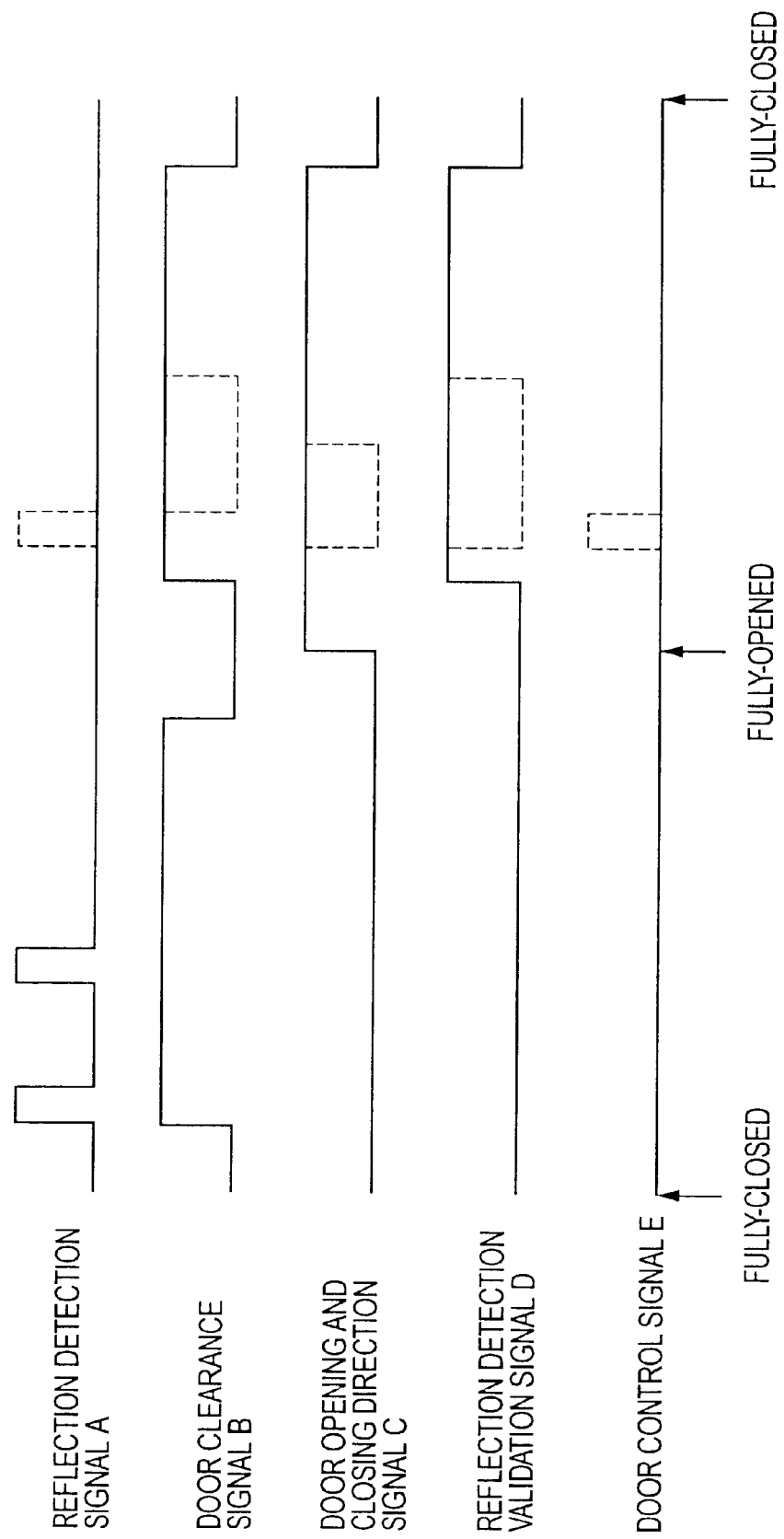
FIG. 5 is a timing chart showing a control method for the opening and closing apparatus in FIG. 4.

FIG. 5 is a timing chart showing a control method for the opening and closing apparatus in FIG. 4. In the figure, the reflection detection signal A is output from the reflection detector portion 37 to the door control portion 34 when reflection detection beams 25 reflected by an obstruction 28 enter the second light-receiving portions 27. The door clearance signal B is output from the door clearance detector portion 41 to the door control portion 34 when the clearance between the elevator doors 1 and 2 reaches a preset range.

The door opening and closing direction signal C is output from the door direction output portion 42 to the door control portion 34 when the direction of operation of the elevator doors 1 and 2 is the closing direction. A reflection detection validation signal D is output when both the door clearance signal B and the door opening and closing direction signal C are output. In other words, the reflection detection effective signal D is effective when the direction of operation of the elevator doors 1 and 2 is the closing direction and the clearance between the elevator doors 1 and 2 is within the preset range.

A door control signal E is output if the reflection detection signal A is input into the door control portion 34 when the reflection detection validation signal D is valid, as indicated by the broken lines in FIG. 5, for example, thereby reversing the direction of operation of the elevator doors 1 and 2 to the opening direction.

In the opening and closing apparatus of this kind, since detection of obstructions 28 is effective only when the direction of operation of the elevator doors 1 and 2 is the closing direction and the clearance (width of opening) between the elevator doors 1 and 2 is within a preset range, malfunction is prevented, enabling reliability to be improved.

Embodiment 3

Figure 6:
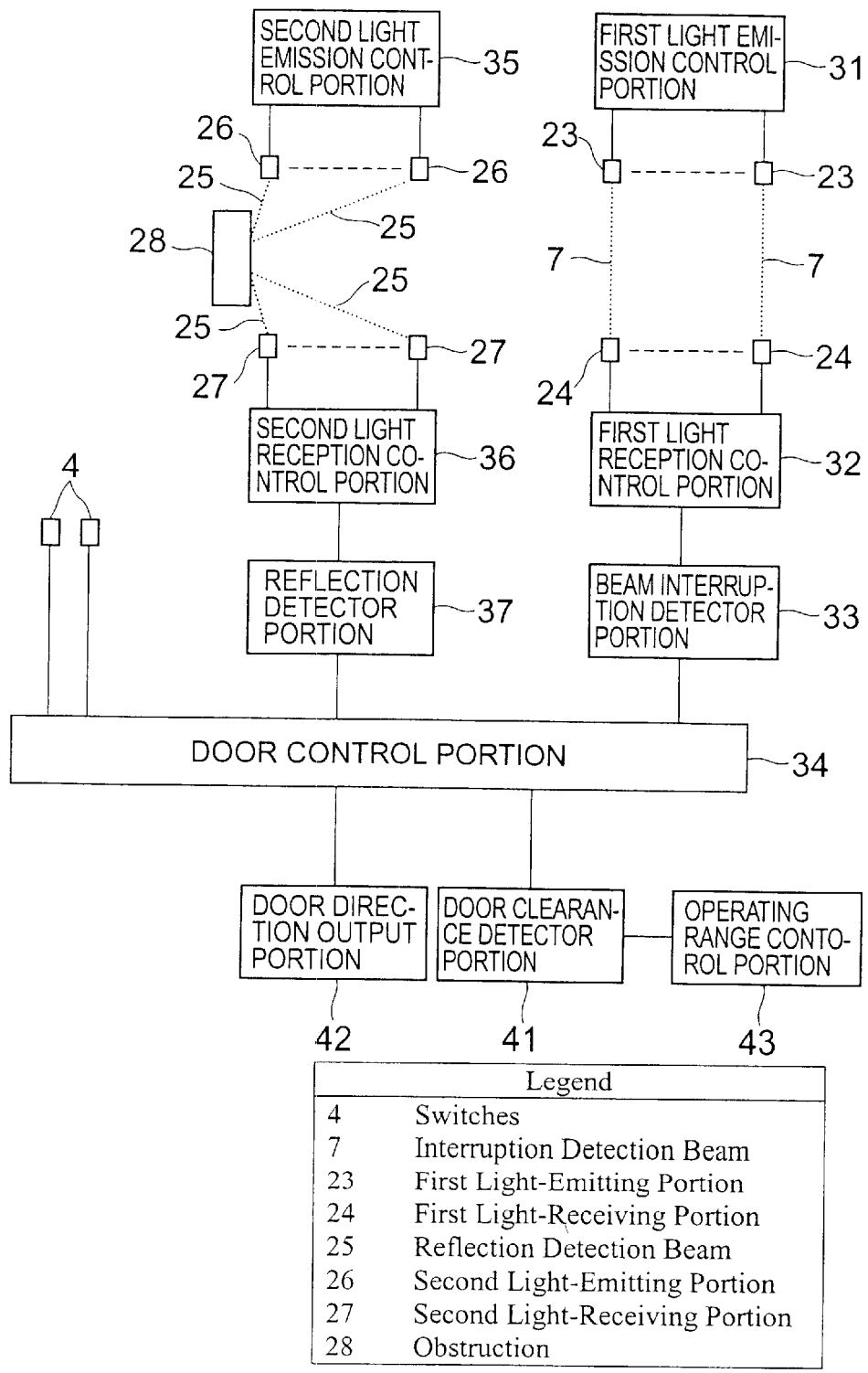
FIG. 6 is a block diagram showing an opening and closing apparatus for an elevator door according to Embodiment 3 of the present invention.

FIG. 6 is a block diagram showing an opening and closing apparatus for an elevator door according to Embodiment 3 of the present invention. In the figure, a signal from an operating range control portion 43 within a control board is input into the door clearance detector portion 41. The rest of the construction is similar to that of Embodiment 2.

Figure 7:
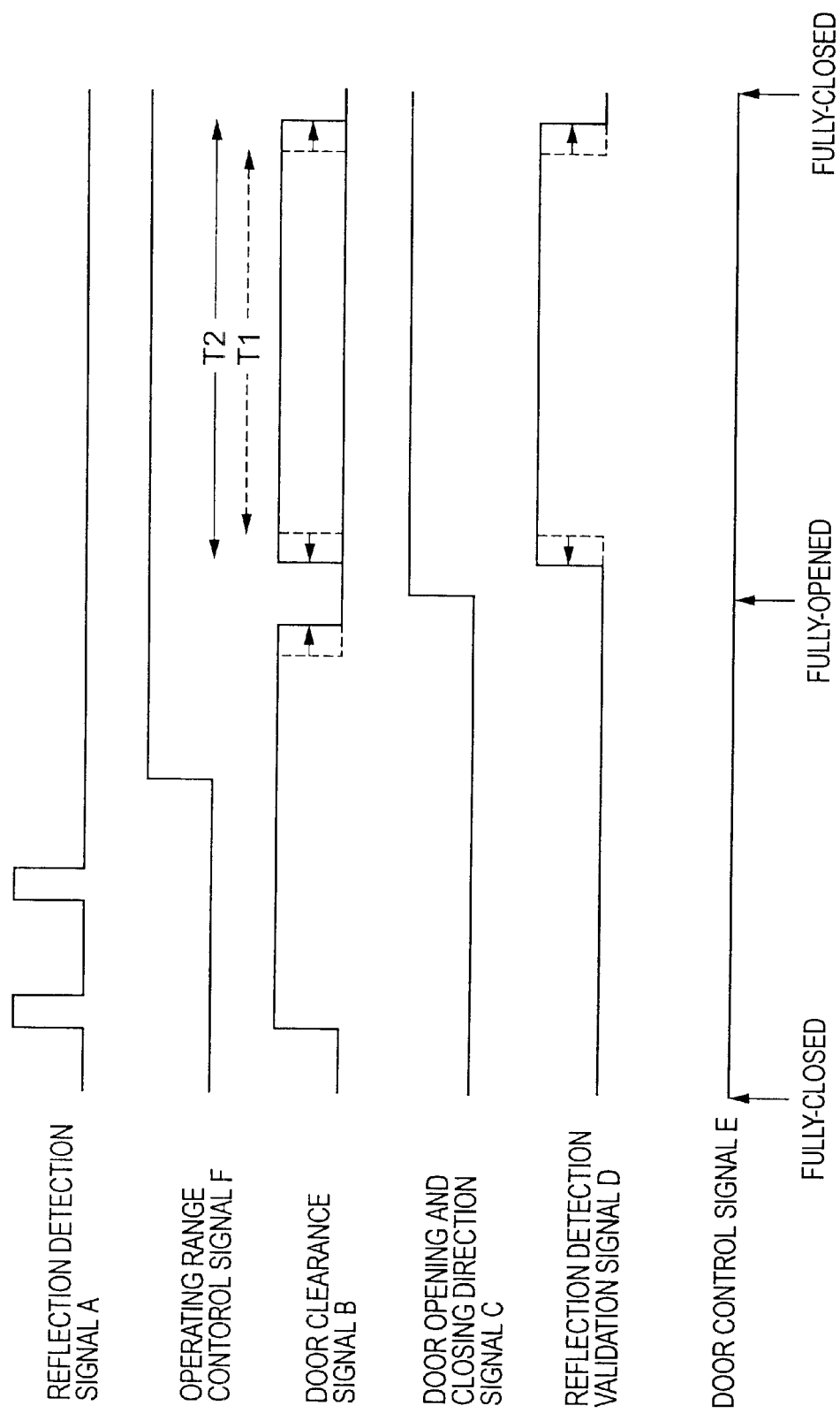
FIG. 7 is a timing chart showing a control method for the opening and closing apparatus in FIG. 6.

FIG. 7 is a timing chart showing a control method for the opening and closing apparatus in FIG. 6. In the figure, an operating range control signal F is output under preset conditions such as when a wheelchair user uses the elevator, for example. If the operating range control signal F is output, the door clearance signal B is output for a range T2 which is wider than the normal set range T1. Hence, the output range of the reflection detection effective signal D is also widened. In other words, the output of the reflection detection signal A is effective for a wider range than normal.

Hence, by outputting the operating range control signal F and widening the effective range of the reflection detection signal A in response to a use information signal from the control board, the elevator can adapt more closely to the passenger, enabling the passenger to feel safe about using the elevator.

Embodiment 4

Figure 8:
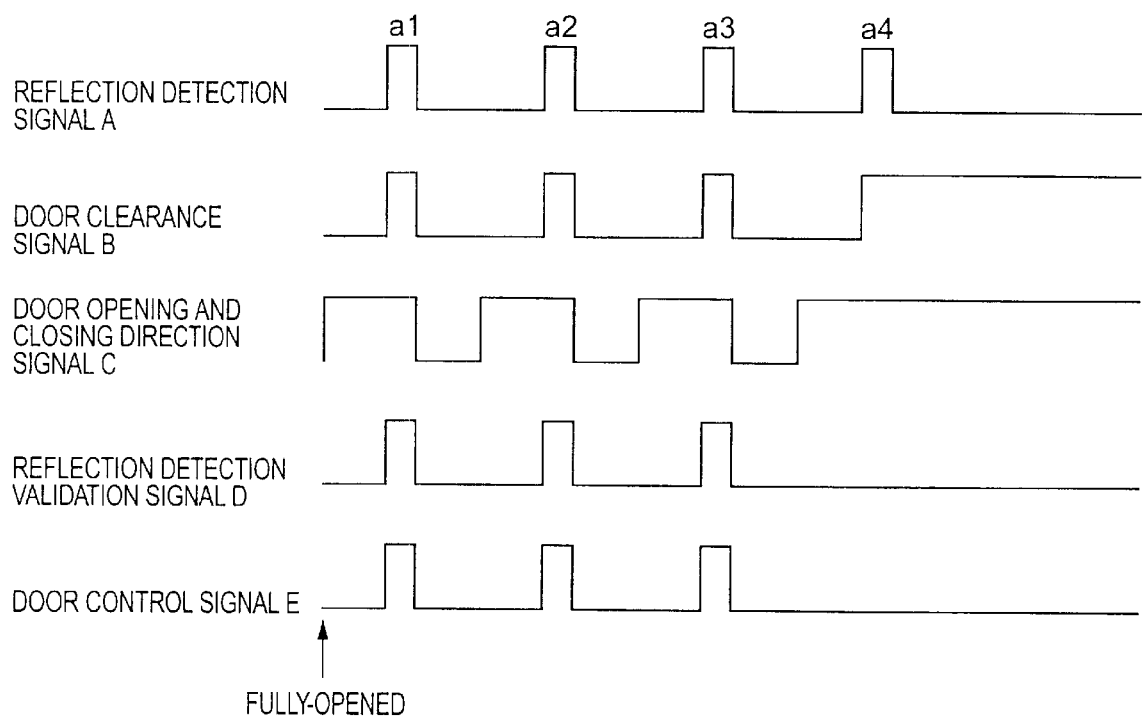
FIG. 8 is a timing chart showing a control method for an opening and closing apparatus for an elevator door according to Embodiment 4 of the present invention.

FIG. 8 is a timing chart showing a control method for an opening and closing apparatus for an elevator door according to Embodiment 4 of the present invention. In this example, when the reflection detection signal A has been output a preset number of times in succession, the reflection detection validation signal D is invalidated thereafter. In FIG. 8, the set number of times is three times, and since the reflection detection validation signal D is invalidated, the door control signal E is not output for the fourth reflection detection signal a4. However, the beam interruption detection signal from the beam interruption detector portion 33 (FIG. 3) and the displacement detection signals from the switches 4 (FIG. 3) are valid. The rest of the construction is similar to that of Embodiment 1.

According to the control method of this kind, since reflection detection is invalidated when the reflection detection signal A is detected repeatedly, the operating efficiency of the elevator can be improved.

Embodiment 5

Figure 9:
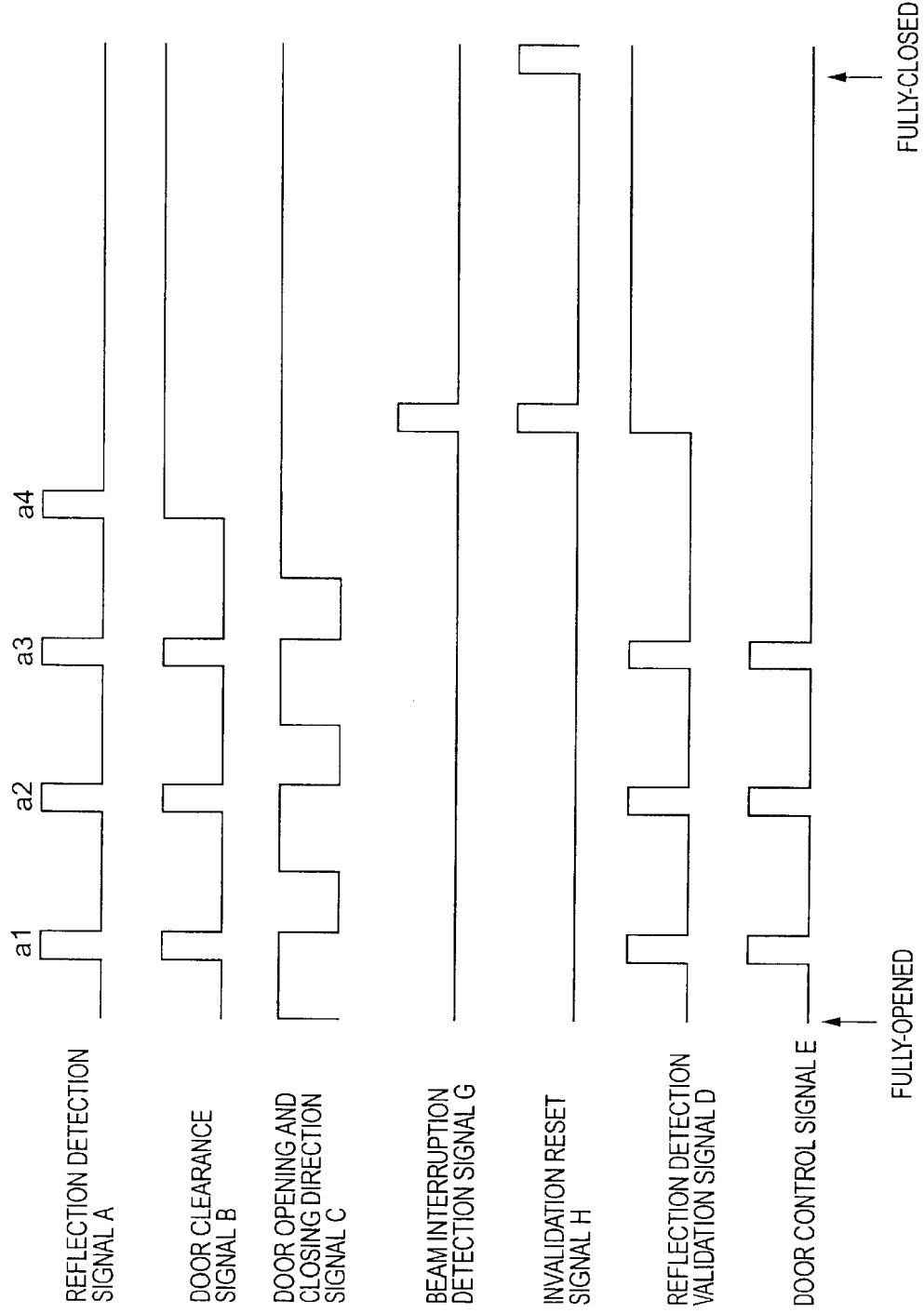
FIG. 9 is a timing chart showing a control method for an opening and closing apparatus for an elevator door according to Embodiment 5 of the present invention.

FIG. 9 is a timing chart showing a control method for an opening and closing apparatus for an elevator door according to Embodiment 5 of the present invention. In the figure, the beam interruption detection signal G is output from the beam interruption detector portion 33 (FIG. 3) when the interruption detection beams 7 (FIG. 1) are interrupted. An invalidation reset signal H is output when the beam interruption detection signal G is output and when the elevator doors 1 and 2 are in a fully-closed state. If the invalidation reset signal H is output, the invalidation of the reflection detection validation signal D, whereby the reflection detection signal A was forcibly invalidated due to having been detected a set number of times in succession, is removed. The rest of the construction and the control method are similar to those of Embodiment 4.

According to the control method of this kind, the reflection detection validation signal D is invalidated due to repeated detection of the reflection detection signal A in a similar manner to Embodiment 4, but if the beam interruption detection signal G is output thereafter, it is decided that there is still an obstruction between the elevator doors 1 and 2, the reason for invalidation due to repeated detection is removed, and the reflection detection validation signal D is re-validated. Consequently, obstructions can be more reliably prevented from colliding with the elevator doors 1 and 2 or the safety shoes 21 and 22 while improving the operating efficiency of the elevator.

Embodiment 6

Figure 10:
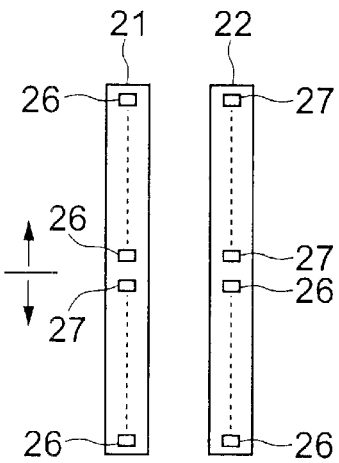
FIG. 10 is a structural diagram showing part of an opening and closing apparatus for an elevator door according to Embodiment 6 of the present invention.

In Embodiments 1 to 5, the second light-emitting portions 26 are disposed in the first safety shoe 21 and the second light-receiving portions 27 are disposed in the second safety shoe 22, but as shown in FIG. 10, for example, the first and second safety shoes 21 and 22 may also be divided into a plurality of regions in a height direction, the arrangement of the second light-emitting portions 26 and the second light-receiving portions 27 being reversed in each region.

Embodiment 7

Figure 11:
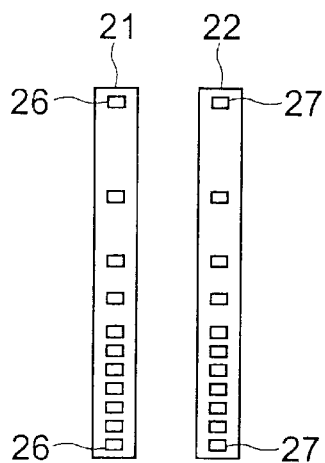
FIG. 11 is a structural diagram showing part of an opening and closing apparatus for an elevator door according to Embodiment 7 of the present invention.

In Embodiments 1 to 6, the second light-emitting portions 26 and the second light-receiving portions 27 are disposed at an even pitch, but they do not need to be disposed at an even pitch. As shown in FIG. 11, for example, the second light-emitting portions 26 and the second light-receiving portions 27 may also be disposed sparsely in upper portions of the safety shoes 21 and 22 and densely in lower portions of the safety shoes 21 and 22.

Embodiment 8

Figure 12:
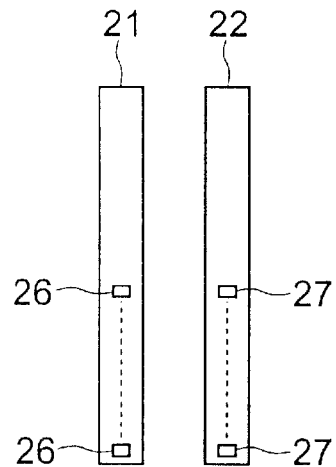
FIG. 12 is a structural diagram showing part of an opening and closing apparatus for an elevator door according to Embodiment 8 of the present invention.

In Embodiments 1 to 7, the second light-emitting portions 26 and the second light-receiving portions 27 are disposed over the whole of the safety shoes 21 and 22, but as shown in FIG. 12, for example, they may also be disposed partially. In FIG. 12, the second light-emitting portions 26 and the second light-receiving portions 27 are disposed only in the lower halves of the safety shoes 21 and 22.

Embodiment 9

Figure 13:
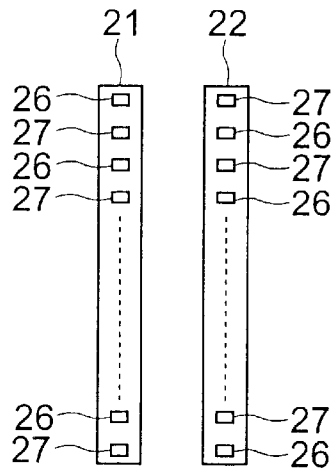
FIG. 13 is a structural diagram showing part of an opening and closing apparatus for an elevator door according to Embodiment 9 of the present invention.

As shown in FIG. 13, for example, the second light-emitting portions 26 and the second light-receiving portions 27 may also be disposed alternately in the safety shoes 21 and 22.

Embodiment 10

Figure 14:
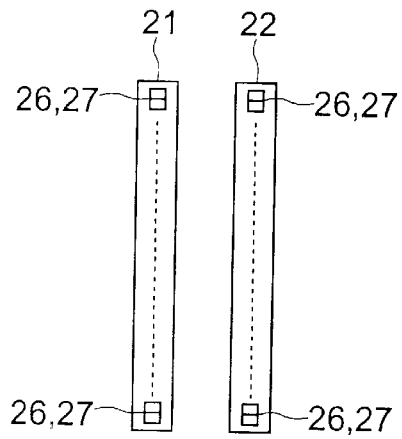
FIG. 14 is a structural diagram showing part of an opening and closing apparatus for an elevator door according to Embodiment 10 of the present invention.
Figure 15:
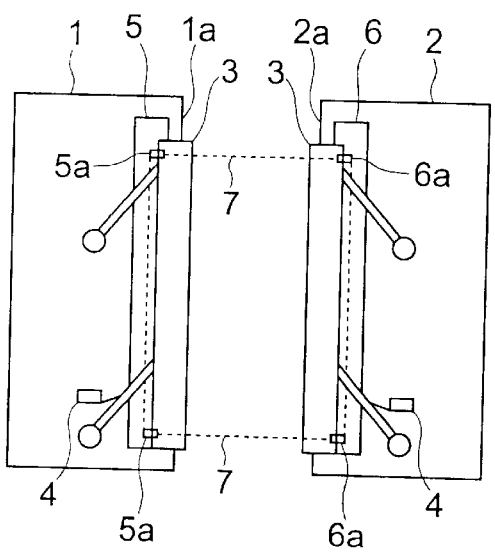
FIG. 15 is a front elevation of a conventional opening and closing apparatus for an elevator door viewed from a landing side.
Figure 16:
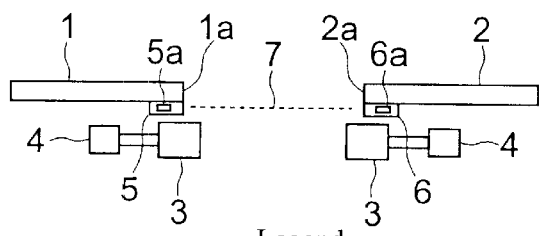
FIG. 16 is a plan showing the opening and closing apparatus in FIG. 15.
Figure 17:
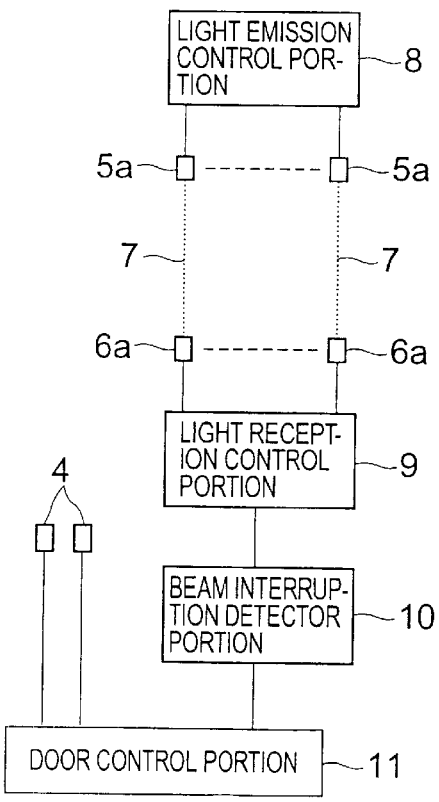
FIG. 17 is a block diagram showing the opening and closing apparatus in FIG. 15.

As shown in FIG. 14, for example, sets of second light-emitting portions 26 and second light-receiving portions 27 may also be disposed in both the first and second safety shoes 21 and 22, making it possible to selectively switch which of the first safety shoe 21 side and the second safety shoe 22 side are designated as the second light-emitting portions 26 depending on position in the height direction of the safety shoes 21 and 22.

In addition, in Embodiments 1 to 10, centrally-opening elevator doors 21 and 22 are shown, but the present invention can also be applied to an elevator door opening to one side only. In that case, one of either the light-emitting portions or the light-receiving portions is mounted to a mount portion on the elevator door, and the other is mounted to a facing portion on the doorway frame, etc., facing the mount portion.

What is claimed is:

1. An opening and closing apparatus for an elevator door comprising:
   a light-emitter for emitting a reflection detection beam toward a landing side obliquely, relative to an opening and closing direction of an elevator door, said light-emitter portion being disposed in one of (i) a mount positioned on a doorstop edge of the elevator door and (ii) a facing portion facing the mount;
   a light-detector for detecting the reflection detection beam reflected by an obstruction on the landing side, said light-detector being disposed in the other of (i) the mount and (ii) the facing portion;
   a reflection detector for detecting the reflection detection beam entering said light-detector and outputting a reflection detection signal; and
   a door control for controlling opening and closing of the elevator door in response to the reflection detection signal from said reflection detector, wherein said door control invalidates the reflection detection signal if the reflection detection signal is input a number of times in succession.

2. The opening and closing apparatus for an elevator door according to claim 1 wherein the mount is a safety shoe disposed on the elevator door.

3. The opening and closing apparatus for an elevator door according to claim 2 wherein said facing portion is a safety shoe disposed on an elevator door abutting said elevator door.

4. The opening and closing apparatus for an elevator door according to claim 1 wherein said door control reverses direction of operation of the elevator door to an opening direction if the reflection detection signal is input when the direction of operation of the elevator door is a closing direction and a width of opening of the elevator door is within a range.

5. The opening and closing apparatus for an elevator door according to claim 4 wherein said door control adjusts the range of the width of opening of the elevator door in which the reflection detection signal is valid, in response to a use information signal from an elevator control board.

6. The opening and closing apparatus for an elevator door according to claim 1 further comprising a beam interruption detector for detecting interruption of an interruption detection beam emitted along the opening and closing direction of the elevator door, above a doorsill for guiding opening and closing of the elevator door, the reflection detection signal being revalidated if a beam interruption detection signal from said beam interruption detector is input into said door control after the reflection detection signal has been invalidated.

7. An opening and closing control method for an elevator door comprising:
   emitting a reflection detection beam toward a landing side obliquely, relative to an opening and closing direction of an elevator door during closing of the elevator door;
   monitoring whether the reflection detection beam is reflected by an obstruction on the landing side;
   reversing a direction of operation of the elevator door to an opening direction when reflection of the reflection detection beam is detected; and
   invalidating detection of reflection of the reflection detection beam if reflection of the reflection detection beam is detected a number of times in succession.

8. The opening and closing control method for an elevator door according to claim 7 including reversing the direction of operation of the elevator door to an opening direction if reflection of the reflection detection beam is detected when the direction of operation of the elevator door is a closing direction and a width of opening of said elevator door is within a range.

9. The opening and closing control method for an elevator door according to claim 8 including adjusting the range of the width of opening of the elevator door in which detection of reflection of the reflection detection beam is valid, in response to a use information signal from an elevator control board.

10. The opening and closing control method for an elevator door according to claim 7 including
    emitting an interruption detection beam during closing of the elevator door along the opening and closing direction of the elevator door, above a doorsill for guiding opening and closing of the elevator door;
    monitoring the interruption detection beam for interruption by an obstruction; and
    re-validating detection of reflection of the reflection detection beam, if interruption of the interruption detection beam is detected, after detection of reflection of the reflection detection beam has been invalidated.

* * * * *